United States Patent Office 2,976,116
Patented Mar. 21, 1961

2,976,116

METHOD OF PREPARATION OF BARIUM TITANATE POWDER

Walter W. Malinofsky, Red Bank, N.J., assignor to the United States of America as represented by the Secretary of the Army No Drawing. Filed Mar. 3, 1958, Ser. No. 718,927

4 Claims. (Cl. 23—51)

(Granted under Title 35, U.S. Code (1952), sec. 266)

The invention described herein may be manufactured and used by or for the Government for governmental purposes without the payment of any royalty thereon.

This invention relates to a method of preparing barium titanate powder in a form which is particularly useful for the production of ceramics having a low temperature coefficient of dielectric constant.

The ceramic industry for a number of years has attempted to make barium titanate ceramics with a low temperature coefficient of dielectric constant over a temperature range of —55° C. to 150° C. Dielectric materials having these properties are utilized in the design of temperature stable, critically tuned electronic circuits used in the manufacture of electronic communication equipment such as radar devices and guided missiles. Past research in this field has shown this desired property to be closely connected to particle size and $c/a$ ratio of the barium titanate lattice constant, that is, the ratio of the sides of the smallest unit cell of the crystal.

Presently used techniques for making barium titanate ceramics consist in forming fine particles of barium titanate from its acid salts at low temperature with very small $c/a$ ratio and then to add various metal oxides in order to maintain this particle size and $c/a$ ratio at high temperatures. U.S. Patent 2,695,240, for instance, uses barium titanate oxalate as the starting material. The direct production of fine particles of barium titanate with very small $c/a$ ratio from the reaction of barium carbonate with titanium dioxide has not succeeded in the past due to incomplete reaction. At about 830° C., where one attains the desired low $c/a$ ratio, the reaction between barium carbonate and titanium dioxide goes only to 66% of completion. This reaction is not complete until 1200° C. but at this temperature the resulting barium titanate shows the normally large $c/a$ ratio of tetragonal barium titanate. Firing at 900 C. leads to only 80% completion of the reaction and the $c/a$ ratio is nearly as large as that of normal tetragonal barium titanate.

I now have found that barium titanate powder of small particle size and small $c/a$ ratio may be produced from barium carbonate and titanium dioxide by grinding together dry titanium dioxide and dry barium carbonate in the molar ratio of 1:1, pressing the resulting mixture at relatively high pressure without using a binder into a pellet, heating said pellet in an oxygen atmosphere at a temperature between about 650 to 900° C. and quenching the heated pellet in a stream of purified oxygen.

The invention will become more apparent from the following description of a specific embodiment of the broad inventive idea.

Chemically pure barium carbonate and titanium dioxide were carefully dried before weighing by heating for approximately 15 hours at 200° C. in air, and then stored in a desiccator. Each compound was weighed out to an accuracy of 0.1 milligram in the molar ratio 1:1. The two compounds were then mixed by quartering and ground in a boron carbide mortar for approximately 40 minutes. The resultant mixture (about 2 grams) was pressed into a ½-inch diameter pellet under 25,000 pounds per square inch pressure, using no binder. The pellet, supported on a platinum sheet, was next placed into a Baker type platinum wound resistance type muffle furnace, which was already heated at 650° C. Approximately one atmosphere of purified oxygen was passed through the furnace at about 1½ liters per minute. The temperature was gradually raised for two hours to 900° C., at which point the pellet was allowed to soak for sixteen hours. The pellet was then quenched by transferred it with silver tipped forceps to a Vycor tube through which a stream of purified oxygen flowed. The purification consisted of passing the gas through a tube of CuO heated to 500° C., to remove any hydrogen present, and then through U-tubes of calcium chloride and phosphorous pentoxide to remove water. The gas was also preheated to 500° C. before entering the furnace.

A pellet made according to the above-described method was ground in a boron carbide mortar and some of the powder rolled onto a Vaseline coated glass fiber. A Debye-Scherrer X-ray pattern of this specimen was next prepared using nickel-filtered copper radiation in a 57.3 mm. radius camera. Exposure time was twenty hours. Evaluation of the X-ray pattern clearly showed the sample to be nearly cubic $BaTiO_3$ ($c/a \approx 1$), instead of the tetragonal form ($c/a = 1.01$) normally found at room temperature. Also the reaction had gone to 100% completion. All the X-ray diffraction lines were broad, much more than those normally obtained from $BaTiO_3$. Since diffraction line breadths are inversely related to crystallite size, it is evident that the particles of the $BaTiO_3$ powder made according to this invention are very small, much smaller than those normally obtained.

It will be evident to those skilled in the art that various changes and modifications of the process described may be used within the broad inventive idea as defined in the appended claims.

What is claimed is:

1. A method of preparing chemically pure barium titanate having essentially cubic crystal form comprising grinding together carefully dried, chemically pure titanium dioxide and barium carbonate in the molar ratio of 1:1, pressing the resulting mixture at relatively high pressures into a pellet, heating said pellet in an atmosphere of chemically pure oxygen at temperatures between about 650 to 900° C. and quenching said pellet in a stream of purified oxygen.

2. A method of preparing barium titanate powder according to claim 1 in which said barium carbonate and said titanium dioxide are dried by heating for approximately 15 hours at 200° C. in air.

3. A method according to claim 1 is which the mixture of titanium dioxide and barium carbonate is pressed at about 25,000 pounds per square inch.

4. A method according to claim 1 in which the temperature is gradually raised within a period of two hours from 650 to 900° C. at which point the pellet is allowed to soak in the oxygen atmosphere for about sixteen hours.

References Cited in the file of this patent

UNITED STATES PATENTS

| | | |
|---|---|---|
| 2,166,221 | Patterson | July 18, 1939 |
| 2,646,359 | Wainer | July 21, 1953 |
| 2,812,234 | Robinson | Nov. 5, 1957 |
| 2,908,579 | Nelson et al. | Oct. 13, 1959 |

FOREIGN PATENTS

| | | |
|---|---|---|
| 466,210 | Canada | June 27, 1950 |